(No Model.)

F. A. HOUCK & T. C. CARTER.
CHURN.

No. 325,084. Patented Aug. 25, 1885.

WITNESSES:
John H. Deemer
C. Sedgwick

INVENTOR:
F. A. Houck
T. C. Carter
BY Munn & Co.
ATTORNEYS.

UNITED STATES PATENT OFFICE.

FRANK A. HOUCK AND THOMAS C. CARTER, OF HOLDEN, MISSOURI.

CHURN.

SPECIFICATION forming part of Letters Patent No. 325,084, dated August 25, 1885.

Application filed April 20, 1885. (No model.)

*To all whom it may concern:*

Be it known that we, FRANK A. HOUCK and THOMAS C. CARTER, both of Holden, in the county of Johnson and State of Missouri, have invented a new and Improved Churn, of which the following is a full, clear, and exact description.

Reference is to be had to the accompanying drawings, forming part of this specification, in which similar letters of reference indicate corresponding parts in all the figures.

Figure 1:
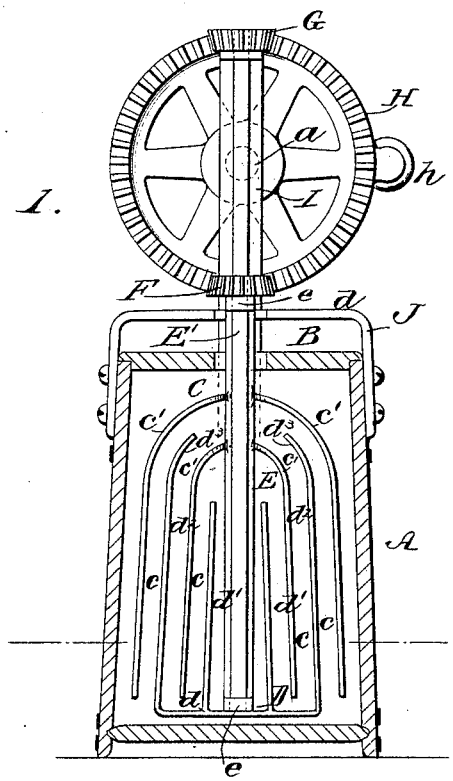
Figure 3:
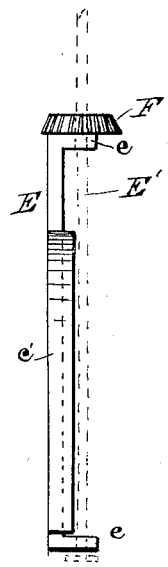
Figure 2:
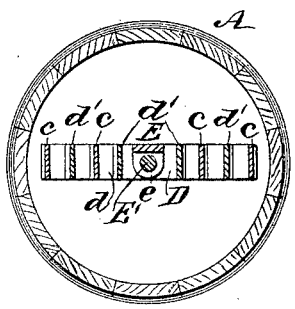

Figure 1 is a sectional elevation of our new and improved churn. Fig. 2 is a sectional plan view of the same, taken on the line $x\ x$ of Fig. 1. Fig. 3 is a side elevation of the plate E.

The object of our invention is to improve and cheapen the construction of that class of churns wherein two dashers revolving in opposite directions are used to agitate the cream; and the invention consists, principally, in attaching the arms of the upper dasher to an upright plate that revolves around the main upright shaft and agitates the cream at the center of the churn.

The invention also consists in the construction and arrangement of parts, as will be hereinafter fully described and claimed.

Referring to the drawings, A represents the body of the churn, provided with the cover B, and C represents the upper and D the lower dasher. The dasher D is secured rigidly to the lower end of the main upright shaft E', and is composed of the bottom plate, $d$, inner upright straight blades, $d'\ d'$, and outer upright blades, $d^2\ d^2$, that are curved at their upper ends toward each other, as shown at $d^3\ d^3$, Fig. 1. The upper dasher, C, is composed of the blades $c\ c$, that are attached to the upright plate E. The blades $c\ c$ are curved at their upper ends, as shown at $c'\ c'$. The plate E is bent at its upper and lower ends to form the side projections or lugs, $e\ e$, through which the shaft E' passes, or, rather, by which the upper dasher, C, is placed loosely upon the shaft E'.

To the upper surface of the upper projection or lug $e$ of plate E is secured the beveled gear-wheel F, through which the shaft E' passes, and to the upper end of the shaft E' is secured the beveled gear-wheel G. A large gear-wheel, H, is journaled on a gudgeon, $a$, attached to the upright plate I, which is made a part of a frame, J, secured to the top of the churn-body A. The large gear-wheel H meshes with both gear-wheels F and G, and is provided with a crank, $h$, for revolving it for operating the dashers C D, which, owing to the arrangement of the gear-wheels, will be turned in opposite directions.

The churn being in operation, the greater portion of the blades of the dashers will agitate the cream in an ordinary way; but at the top of the body of cream in the churn, the blades being curved, as shown at $c'$ and $d^3$, they will agitate the cream less there than anywhere else, so that there will be no splashing of cream out of the churn. This enables the cover B to be removed to inspect the cream without stopping the churn.

Another advantage results from the plate E, which, when the gear-wheel H revolves, turns around the shaft E', agitates the cream at the center of the churn, and causes circulation of the cream from the center outward, and prevents all eddying of the cream in the churn, and by making the plate E flat and bending it to form projections $e$ the churn is cheapened in cost of manufacture, and the dasher is more readily kept clean than when a tube is used to carry the dasher-blades $c$.

Having thus described our invention, what we claim as new, and desire to secure by Letters Patent, is—

1. In a churn, the combination, with the upper dasher having depending blades $c$, curved downward at their upper ends, of the lower dasher having a cross-piece, $d$, and inner and outer vertical blades, $d'\ d^2$, projecting therefrom between the blades $c$, the outer blades, $d^2$, being curved inward at their upper ends to correspond with the curves $c'$ of the upper blades, substantially as set forth.

2. The dasher C, consisting of the upright plate E, provided at its opposite ends with apertured lugs $e$, and the outward and downward curved blades $c'\ c'$, secured at their upper ends to the opposite edges of plate E at right angles to its lugs, substantially as set forth.

FRANK A. HOUCK.
THOMAS C. CARTER.

Witnesses:
W. G. KING,
T. W. HOUCK.